(No Model.)

L. M. GILLETT.
SULKY HARROW.

No. 269,044.

Patented Dec. 12, 1882.

WITNESSES:
Donn Twitchell
C. Sedgwick

INVENTOR:
L. M. Gillett
BY
Munn & Co
ATTORNEYS.

UNITED STATES PATENT OFFICE.

LEROY M. GILLETT, OF LYONS, KANSAS.

SULKY-HARROW.

SPECIFICATION forming part of Letters Patent No. 269,044, dated December 12, 1882.

Application filed August 31, 1882. (No model.)

*To all whom it may concern:*

Be it known that I, LEROY M. GILLETT, of Lyons, in the county of Rice and State of Kansas, have invented a new and useful Improvement in Sulky-Harrows, of which the following is a full, clear, and exact description.

Reference is to be had to the accompanying drawings, forming part of this specification, in which similar letters of reference indicate corresponding parts in all the figures.

Figure 1:
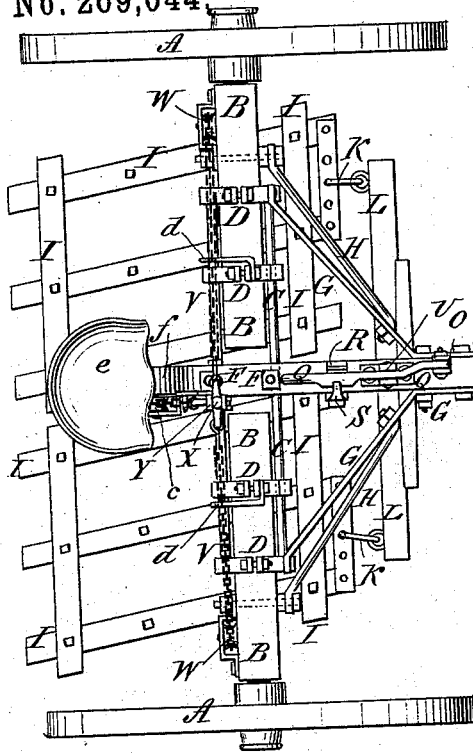
Figure 2:
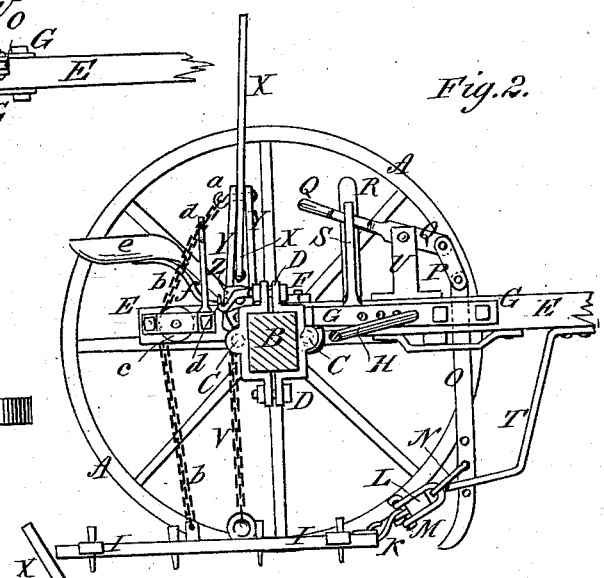
Figure 3:
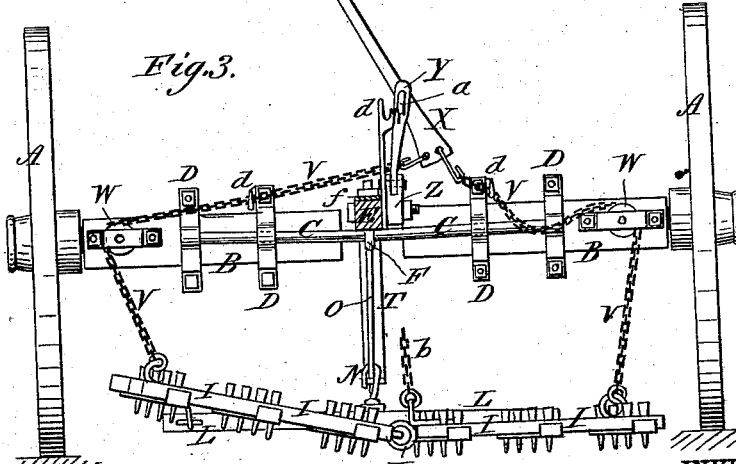

Figure 1 is a plan view of my improvement. Fig. 2 is a sectional side elevation of the same. Fig. 3 is a sectional rear elevation of the same.

The object of this invention is to facilitate the controlling of sulky-harrows.

A represents the wheels, the axle B of which is made in two parts. The parts of the axle B are connected by two rods, C, which are placed at the front and rear sides of the parts of the axle and are secured to the said parts by clamps D, so that the wheels A can be adjusted closer together or farther apart by loosening the said clamps.

E is the tongue, the rear part of which is interposed between the adjacent ends of the parts of the axle B, and is clamped to the rods C by eyebolts F. The connection between the tongue E and the axle B is strengthened by the braces G, the forward ends of which are bolted to the opposite sides of the said tongue E, and their rear ends are bolted to the parts of the axle B. In the braces G are formed a number of holes to receive the bent forward ends of the braces H, the outer ends of which are bolted to the parts of the axle B. The braces G H thus form extension-braces, and can be contracted and extended as the adjustment of the axle may require.

I is the harrow-frame, which is made in two parts or sections connected together by interlocking eyebolts J or other suitable hinges.

With the front ends of the parts of the frame I are connected, by a clevis or link connections, K, the ends of the draw-bar L, the center of which is connected by a clevis, M, and hook N with the lower part of an upright bar, O. Several holes are formed in the bar O to receive the hook N, so that the point of draft attachment can be adjusted higher or lower to cause the harrow to work shallower or deeper in the soil, as may be desired. The upper part of the bar O slides in a slot or recess in the tongue E, and its upper end is connected by a link-connection, P, with the forward end of a lever, Q, so that the bar O can move up and down vertically, while the end of the lever Q moves through the arc of a circle. The lever Q is pivoted to a stud, U, attached to the tongue E, and the rear part of the said lever moves along a catch-bar, R, attached to the tongue E. The lever Q is held in contact with the catch-bar R by a spring, S, also attached to the tongue E, and which extends along the toothed side of the said catch-bar R. By this construction the bar O can be raised and lowered to raise and lower the draft-bar L by operating the lever Q. The draft-strain upon the lower part of the bar O is sustained by the brace-bar T, the upper end of which is attached to the tongue E. The brace-bar T extends downward, and its lower end is inclined to the rearward and has a slot formed through it for the passage of the lower part of the bar O, so that the said bar O can slide up and down freely while being held securely against the draft-strain.

To the side parts of the harrow-frame I are attached the lower ends of two chains, V, which pass over guide-pulleys W, pivoted to the rear side of the axle B, near the wheels A. The upper ends of the chains V are attached to the lower end of the lever X, which is pivoted at a little distance from its lower end to the slotted upper end of the standard Y, so that the lever X can have a free lateral play. The lower end of the slotted standard Y is hinged to a slotted stud, Z, attached to the tongue E at the rear side of the axle B, in such a manner that the standard Y, and with it the lever X, can be turned down in a forward direction. The rear corner of the lower end of the slotted hinged standard Y is made with a shoulder to prevent the said standard from being turned to the rearward any farther than into a vertical position.

To the upper end of the slotted hinged standard Y is attached a hook, *a*, to receive the upper end of a chain, *b*, which passes over a guide-pulley, *c*, pivoted to the side of the rear part of the tongue E. The lower end of the chain *b* is attached to the middle part of the harrow-frame I. With this construction, by moving the upper end of the lever X toward either side, that side of the harrow-frame will be raised to clear the harrow of rubbish or to pass over an obstruction. By moving the upper end of the lever X forward the middle part of the harrow-frame will be raised to clear the harrow of rubbish or to pass an obstruction.

To the parts of the axle B and to the rear part of the tongue E, or to supports attached to the said axle and tongue, are attached hooks $d$, to receive links of the chains V V $b$ when the harrow is raised, to support the harrow away from the ground when passing from place to place.

$e$ is the driver's seat, which is attached to the upper end of the spring-standard $f$. The lower end of the spring-standard $f$ is attached to the rear part of the tongue E.

Having thus described my invention, I claim as new and desire to secure by Letters Patent—

1. The combination, with the axle-sections connected by rods C, and the tongue E, secured between the adjacent ends of said sections and clamped to said rods, of the axle-braces G H, the former provided with holes, into which the bent ends of the latter pass, as shown and described.

2. The combination, with a harrow-frame made in two parts connected by eyebolts, of the two chains V V, the guide-pulleys W, the pivoted lever X, the hinged end-slotted standard Y, the slotted stud Z on the tongue, the chain $b$, hook $a$, and pulley $c$, whereby the lever X will have lateral play and will turn down with the standard, as described.

LEROY M. GILLETT.

Witnesses:
THOMAS J. WOLFE,
BENJAMIN M. HARLEY.